US007853899B1

(12) United States Patent
Damaschke et al.

(10) Patent No.: US 7,853,899 B1
(45) Date of Patent: Dec. 14, 2010

(54) CONFIGURING AND EXTENDING A USER INTERFACE

(75) Inventors: Frank Damaschke, Nussloch (DE); Thomas Vogt, Römerberg (DE)

(73) Assignee: SAP Aktiengesellschaft, Walldorf (DE)

( * ) Notice: Subject to any disclaimer, the term of this patent is extended or adjusted under 35 U.S.C. 154(b) by 860 days.

(21) Appl. No.: 10/335,145

(22) Filed: Dec. 30, 2002

(51) Int. Cl.
G06F 3/048 (2006.01)
(52) U.S. Cl. ............... 715/841; 715/866; 715/762; 715/840; 715/839
(58) Field of Classification Search ................. 715/841, 715/866, 762, 513, 840, 839
See application file for complete search history.

(56) References Cited

U.S. PATENT DOCUMENTS

| | | | | |
|---|---|---|---|---|
| 5,345,550 | A | * | 9/1994 | Bloomfield ................ 715/841 |
| 5,651,108 | A | * | 7/1997 | Cain et al. ................. 715/763 |
| 6,098,073 | A | * | 8/2000 | O'Rourke ................. 707/104.1 |
| 6,243,091 | B1 | | 6/2001 | Berstis |
| 6,820,111 | B1 | | 11/2004 | Rubin et al. |
| 6,996,771 | B1 | * | 2/2006 | O'Brien ...................... 715/513 |
| 7,181,438 | B1 | | 2/2007 | Szabo |
| 7,313,525 | B1 | | 12/2007 | Packingham et al. |
| 7,370,315 | B1 | * | 5/2008 | Lovell et al. ................ 717/100 |
| 2001/0037325 | A1 | | 11/2001 | Biderman et al. |
| 2002/0040311 | A1 | | 4/2002 | Douglass et al. |
| 2002/0087404 | A1 | | 7/2002 | Silkey et al. |
| 2002/0091836 | A1 | | 7/2002 | Moetteli |
| 2004/0076345 | A1 | | 4/2004 | Olszak et al. |
| 2004/0088355 | A1 | | 5/2004 | Hagan et al. |
| 2005/0182753 | A1 | | 8/2005 | Warner et al. |
| 2005/0257400 | A1 | | 11/2005 | Sommerer et al. |
| 2007/0035523 | A1 | | 2/2007 | Cohen |
| 2007/0038610 | A1 | | 2/2007 | Omoigui |

OTHER PUBLICATIONS

Office Action from U.S. Appl. No. 10/335,083, dated Mar. 19, 2008, 8 pages; Jun. 19, 2008 Response to Office Action dated Mar. 19, 2008, 9 pages; Aug. 11, 2008, Supplemental Amendment to Action dated Mar. 19, 2008, 3 pages.
Final Office Action from U.S. Appl. No. 10/335,083, dated Oct. 30, 2008, 8 pages; Dec. 22, 2008 Response to Final Office Action dated Oct. 30, 2008, 13 pages; Advisory Action dated Feb. 18, 2009, 3 pages; Request for Continued Examination (RCE) dated Feb. 19, 2009, 1 page.
Office Action from U.S. Appl. No. 10/335,083, dated May 21, 2009, 7 pages; Aug. 5, 2009 Response to Office Action dated May 21, 2009, 12 pages.
Final Office Action from U.S. Appl. No. 10/756,029 dated Jun. 10, 2009, 21 pages; Aug. 10, 2009 Response to Final Office Action dated Jun. 10, 2009, 14 pages.

(Continued)

*Primary Examiner*—Simon Ke
(74) *Attorney, Agent, or Firm*—Fish & Richardson P.C.

(57) ABSTRACT

Methods and apparatus, including computer program products, for changing a user interface. A method for changing a user interface layout includes presenting a user with one or more exits points into which user instructions for changes to a user interface can be inserted. The method includes receiving user instructions to change a user interface. The method includes receiving a selection of an exit point. The method includes adding the user instructions to instructions for presenting the user interface at the exit point selected.

21 Claims, 9 Drawing Sheets

OTHER PUBLICATIONS

Final Office Action from U.S. Appl. No. 10/335,083, dated Nov. 18, 2009, 9 pages.
Amendment in Reply to Action of Nov. 18, 2009, filed on Jan. 15, 2010 in related U.S. Appl. No. 10/335,083.
Advisory Action dated Feb. 9, 2010 in related U.S. Appl. No. 10/335,083.
Request for Continued Examination, filed on Feb. 17, 2010 in related U.S. Appl. No. 10/335,083.

* cited by examiner

CONFIGURING AND EXTENDING A USER INTERFACE

BACKGROUND

The present invention relates to data processing, and more particularly to user interfaces.

Generally, a data structure is a collection of organized data. Some data structures are represented as hierarchies in which nodes represent data objects and connections between the nodes represent the relationships between the data objects. One type of hierarchy is a tree hierarchy in which there is a root data object from which other data objects branch. Another type of hierarchy is a network hierarchy in which there need not be a root data object. These representations are usually, but need not be, graphical in nature.

A data structure can include nodes that are business objects, which are data objects that relate to one or more processes of an enterprise. Business objects can represent, for example, business partners, equipment, material master records, products, and so forth.

A data structure can be implemented as a product structure. A product structure refers to a collection of data objects that relate to or is associated with a particular product. A product structure can be used to model and configure a configurable product such as, for example, an automobile or a computer. As with other data structures, the data objects of a product structure can have complex relationships that can be represented by a hierarchy, such as a tree hierarchy. The data objects of the product structure can include any type of data objects such as, for example, documents, bills of materials, and product attributes.

Product structures that are included as part of a product design or product modeling application can generally be viewed by a user through a user interface. In certain implementations, the user interface is a Web-based interface established between a client computer and a server computer. A portal is one example of a user interface.

A data structure can also be implemented as, for example, an organization structure and a project hierarchy. The organization structure can indicate relationships between or among units of an organization. For example, an organization structure of an enterprise can indicate that the engineering department includes a development group and a test group. The project hierarchy can indicate relationships between and among components of a project. For example, an organization hierarchy of a product development project can indicate that a component that represents engineering tasks includes another component that represents testing tasks. Like the product structure, the organization structure and project hierarchy can also be included as part of a computer application.

SUMMARY

The present invention provides methods and apparatus, including computer program products, for a configurable and extensible user interface.

In general, in one aspect, a method for changing a user interface layout includes presenting a user with one or more exits points into which user instructions for changes to a user interface can be inserted. The method includes receiving user instructions to change a user interface. The method includes receiving a selection of an exit point. The method includes adding the user instructions to instructions for presenting the user interface at the exit point selected.

In general, in another aspect, a system enabling user changes to user interface layouts includes a data store storing instructions for displaying a first user interface and instructions for displaying a second user interface including available changes for changing a layout of the first user interface. The system includes a processor for displaying the second user interface to a user, receiving user instructions for changing the first user interface through selections and entries made through the second user interface, and displaying the first user interface to reflect the user instructions received.

In general in another aspect, a computer-program product for changing a user interface includes instructions operable to cause a processor to identify one or more exits points in a set of instructions that define a user interface. The exit points are locations in the set of instructions into which user instructions for changes to a user interface can be inserted. The product includes instructions to present a user with one or more of the exit points identified. The product includes instructions to receive user instructions to change a user interface. The product includes instructions to receive a selection of an exit point. The product includes instructions to add, at the exit point selected, the user instructions to the set of instructions that define the user interface. The product is tangibly stored on machine-readable medium.

The invention can be implemented to realize one or more of the following advantages. A configurable and extensible user interface allows users to influence the layout of the user interface, which can be, for example, an interface in product design software. Configurability of the interface allows users to insert content desired by the user in some sections while suppressing content of a standard user interface in other sections.

The user interface can be customized by one or more users, including those who are not developers of the user interface application. For example, the user interface can be customized by an enterprise that is a customer of a provider of the user interface application. As used in this specification, the term user can include an administrator or a developer who were not involved in the development of the user interface application but who are responsible for configuring the user interface for a customer.

A navigation history allows a user navigating through a product structure to see what objects were previously viewed in a user session. The navigation history also allows the user to return to the object by selecting the object in the navigation history. Selection by, for example, selecting an object of interest from the navigation history results in the display of the selected object. Thus, a user need not back track until the object of interest is displayed and returning to a previously selected object is greatly facilitated. Navigation history also can provide an overview perspective of a product structure and, furthermore, can indicate to the user the position of the object currently selected by the user relative to the rest of the product structure.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An object user interface can present users of an application having a plurality of objects with views of the objects. An example of a system having a plurality of objects is a product design application, such as the Product Designer™ application, a component of the R/3™ Enterprise Extension Set™ application distributed by SAP of Walldorf, Germany. The user interface can include a navigation history to allow users to see what objects of the product design process the user previously viewed. The user interface can also be configurable to allow users to change the layout of the user interface.

Figure 1:
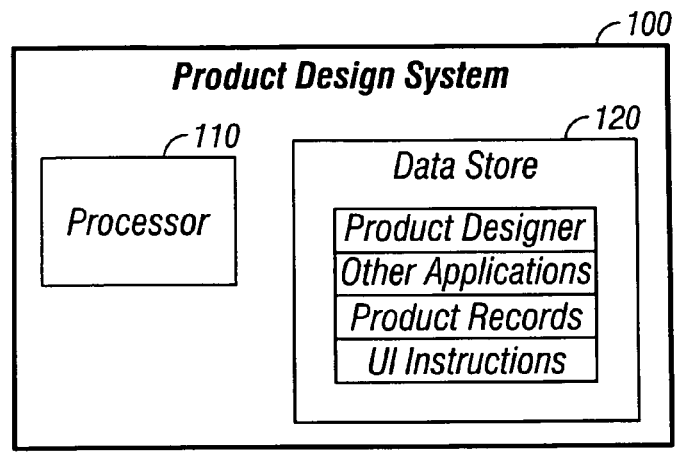
FIG. 1 is a block diagram illustrating a system for displaying a user interface.

As shown in FIG. 1, an object user interface can be implemented in a product design system 100. The product design system can include a processor 110 and a data store 120. The data store 120 can store applications, such as the Product Designer™ application. The data store 120 can also store product records, described below with reference to FIG. 2, and instructions for displaying user interfaces.

Figure 2:
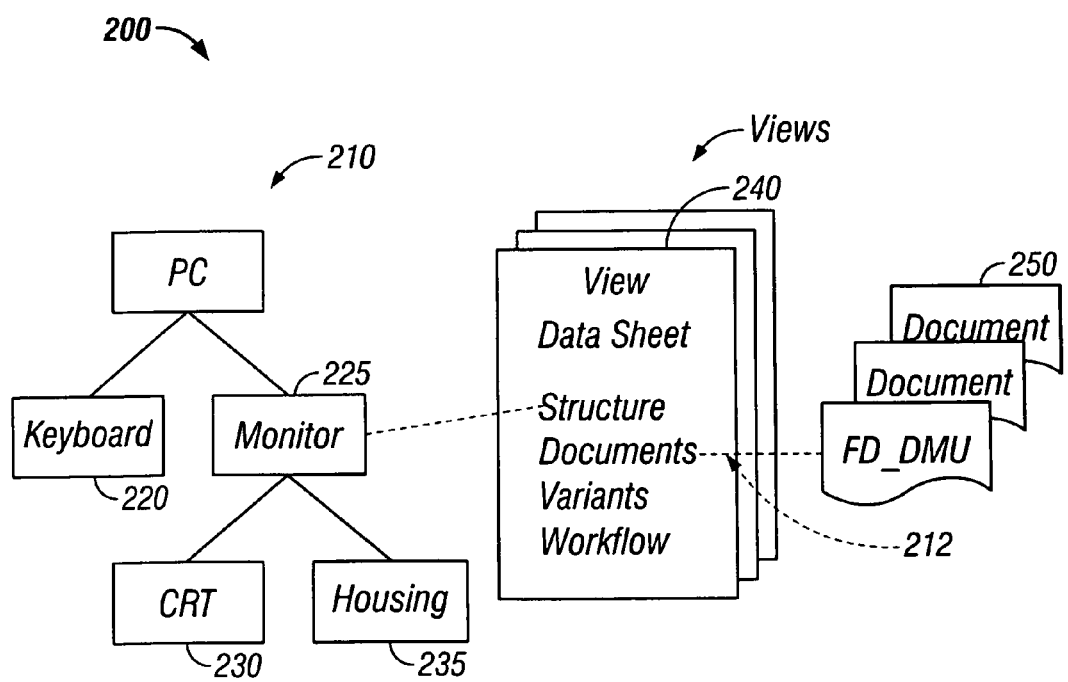
FIG. 2 is a block diagram illustrating a product record in a product design application.

An example of a product record is shown in FIG. 2. Data for a product design process can be stored in records in data store 120 (FIG. 1). The product design data can include objects associated with the product. These objects can include data sheets, product structure, documents, variants, workflow, and so forth. The objects associated with the product product lines, or classes of products. The product record can include a product structure 210 linked to a collection of views such as view 240. Each view includes links such as, for example, link 212, to associated objects. For example, the documents view can be linked to documents 250 by link 212.

A product structure 210 can be arranged in a variety of ways. In one implementation, the product structure 210 can be organized in a tree structure, as shown. The product associated with the product structure 210 can include a specific product or a product line. The product structure 210 can include one or more components such as, for example, components 220 and 225. Components can include parts of the product structure or services. Each component can include one or more sub-components such as, for example, sub-components 230 and 235 of the component 225. Each sub-component can include further sub-components (not shown). For example, if the product 210 is a PC, components can include a keyboard or a monitor. Sub-components of the monitor can include a CRT or a housing.

The product structure 210 can also include variant structures for each component or sub-component. For example, if a component is a brake for a car, the variant structures can include (1) Disc and (ABS or EDS or SER), (2) Drum and SER, and (3) Drum and (ABS or EDS).

Each component and/or sub-component of the product structure 210 can be linked to a collection of views such as, for example, view 240. In the example shown in FIG. 2, the record for monitor 120 is linked to views 240. Each view is linked to associated objects, such as documents 250.

Links between objects of the product record 200 can include "part of" links or associations. For example, for a PC, a monitor can include a "part of" link to the PC, while a document relevant to the monitor can include an association link to the monitor.

Figure 3:
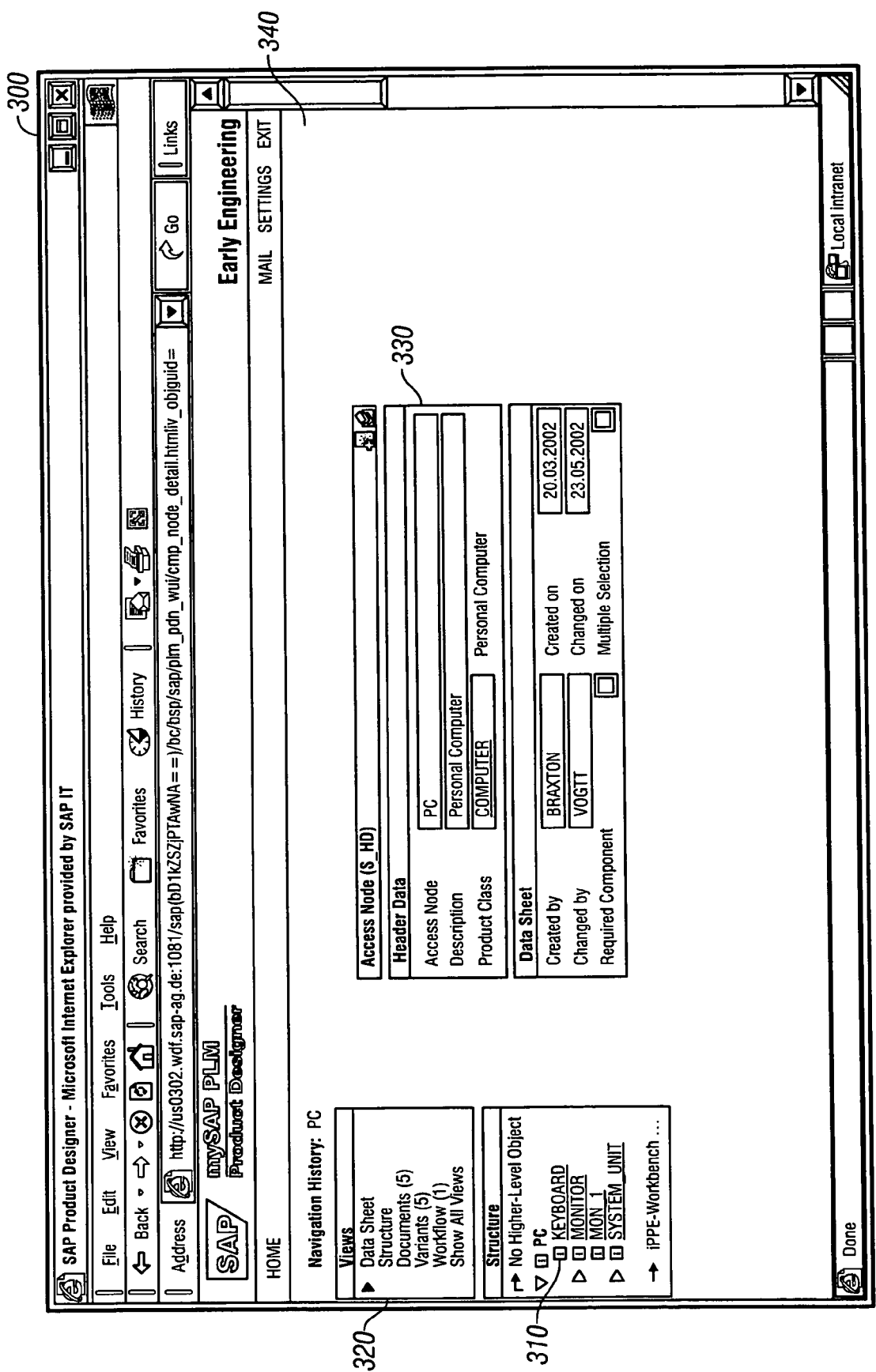
FIG. 3 is a screen shot of a user interface for allowing a user to manipulate a product record.

The product record 200 can be presented to a user through a user interface ("UI") 300, as shown in FIG. 3. The user interface can include a structure area 310 listing components of the product structure 210, a views area 320 listing the available views for the product structure 310, and a work space 330 displaying the component and view on which the user is working.

The UI 300 can also include a navigation history area 340, listing the objects that a user has accessed. In the screen shot 300, the navigation history displays that the user has accessed the "PC" object record. The navigation history 340 can be presented as a breadcrumb trail, as shown, or as other structure types. The navigation history 340 is updated each time a user accesses a new object. Each object listing in the navigation history 340 contains a link to the object, allowing a user to return to the object by selecting the object listing. The navigation history can be stored in persistent memory as a table.

Figure 4:
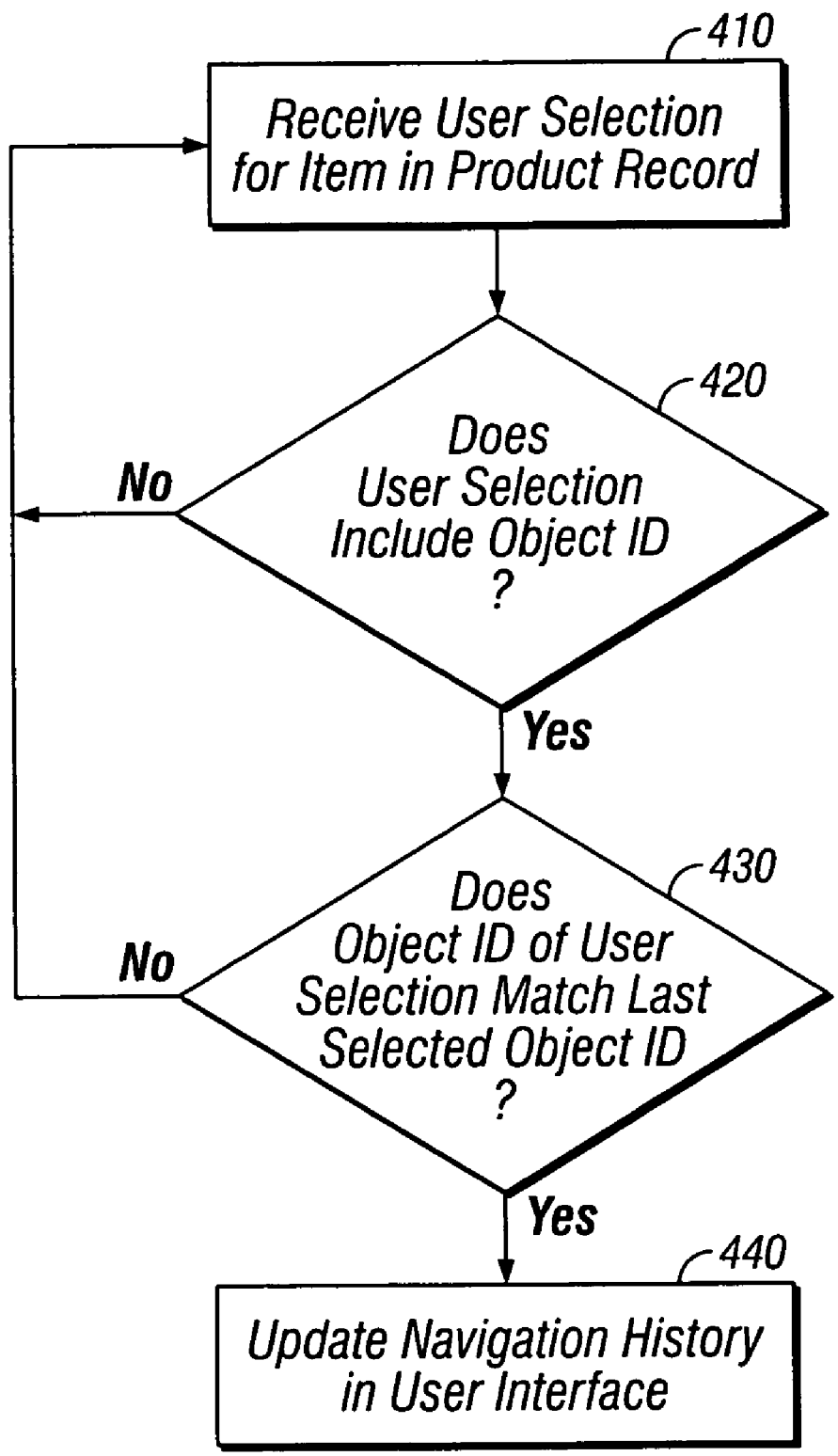
FIG. 4 is a flow diagram illustrating a method for presenting a user with a navigation history in a user interface.

FIG. 4 is a flow diagram illustrating one implementation of a method for presenting a user with a navigation history in UI 300. System 100 receives a user selection of an item in the product record 200 (step 410). The user can submit a selection to system 100 by selecting an item presented through UI 300. For example, the user can select "Monitor" from structure area 310. UI 300 can include a linked subset of objects in the product record. The objects displayed in a given screen can include objects or controls to navigate to objects that are part of or associated with an object of the product record displayed. For example, the screen shot of FIG. 3 displays objects (e.g., "Keyboard," "Monitor") that are part of a PC record, and ways to navigate (e.g., "Views" 320) to other objects that are associated with the PC record. The page representing the object at the highest level of a product structure can be referred to as the home page of the object. The home page of the object can be accessed by a user through a link sent to the user of as a result of a search done by the user.

System 100 determines if the user selection contains an object identification, i.e., "object id" (step 420). An object identification indicates that the user selected an object to view. If the user selection does not contain an object id, the system returns to step 410 to await another user selection.

If the user selection does contain an object id, system 100 determines if the object id matches the object id of the last selected object (step 430). If the object id is the same as the object id of the last selected object, system 100 returns to step 410 to await another user selection. If the object id does not match the object id of the last object selected, system 100 updates the navigational history area 340 in user interface 300 to reflect the new object id. (step 440). The object id is updated independently of the Web page address, if the UI 300 is part of a Web page having an address. Thus, if the Web page address does not change while the object currently selected changes, navigation history 340 will be updated to reflect the change in object. Conversely, if the Web page address changes while the object being viewed does not change, navigation history 340 will not be updated.

Figure 5A:
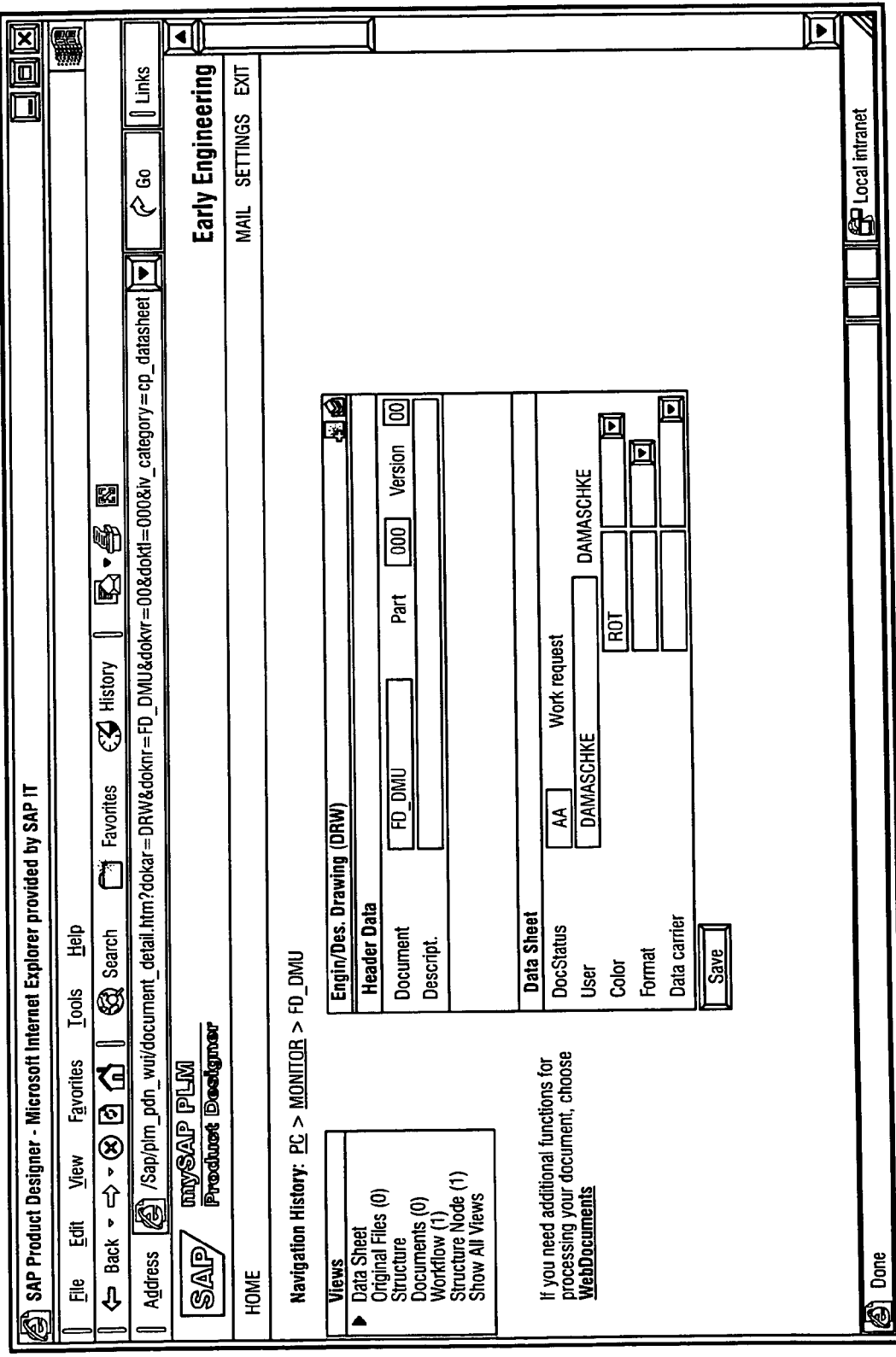
FIGS. 5A and 5B show screen shots illustrating a user interface having a navigation history.
Figure 5B:
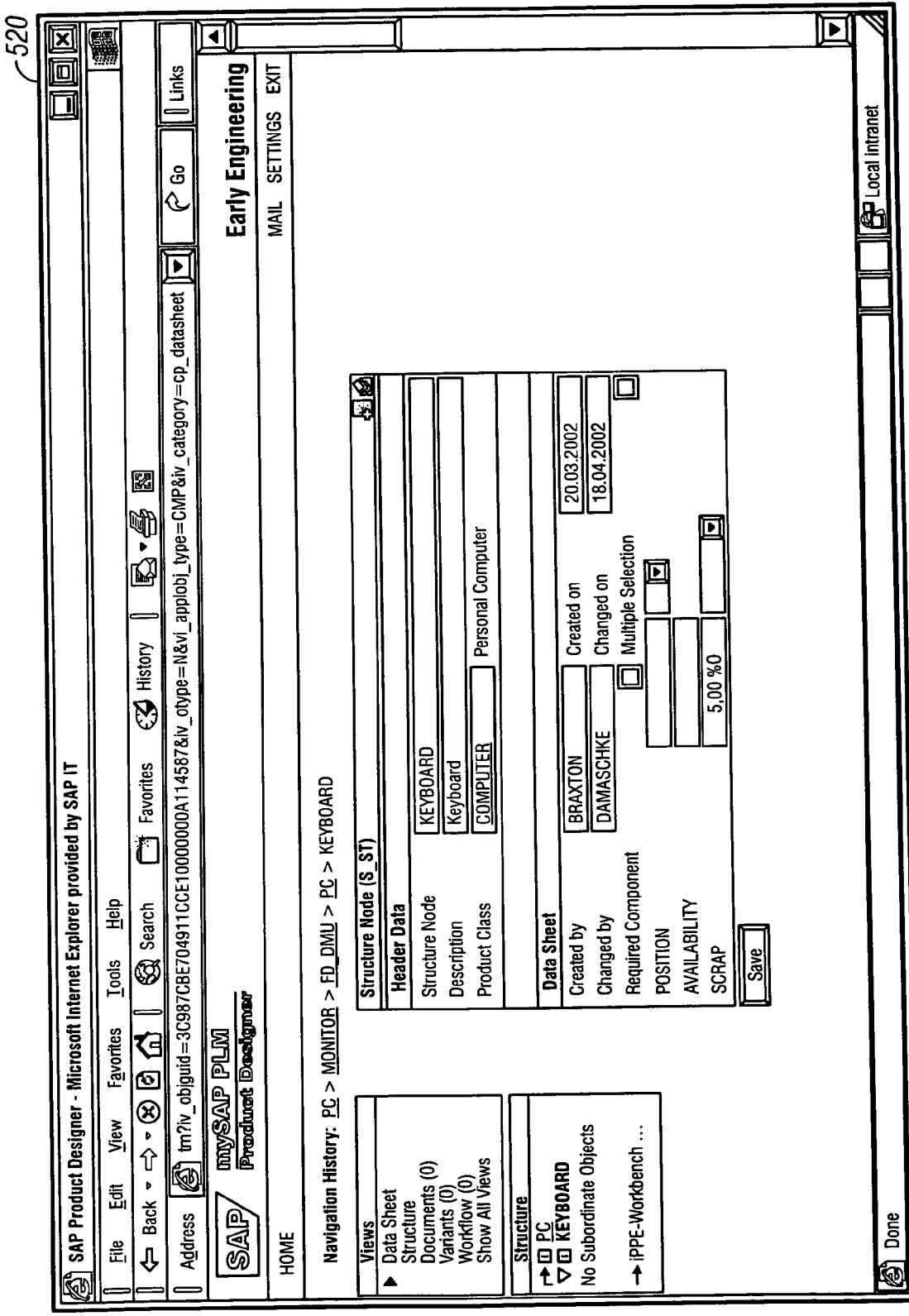

FIGS. 5A and 5B are screen shots illustrating a user interface having a navigation history 340. Screen shot 510 illustrates a navigation history that indicates that the user has selected the objects "PC," "Monitor," and "FD_DMU." Although the user also selected a documents view before selecting document "FD_DMU" 150, the documents view does not show in the navigation history.

Screen shot 520 illustrates a navigation history in which the user returned to the "PC" screen before selecting "Keyboard." System 100 includes "PC" twice in navigation history 340 since the user selected the "PC" screen again after viewing "FD_DMU." Since there was a change in object in between the two viewings of the "PC" screen, system 100 records the path the user took.

System 100 can update the navigation history 340 by storing the object id of the object with the object type of the object. The object type and object id of the object can be stored in a table. The table can be stored in a memory, if the application including user interface 300 is a stateful application (i.e., having memory). The table can be stored in a server side cookie if the application including user interface 300 is a stateless application (i.e., having no memory). The server side cookies can be saved from one response/request cycle to the next. The table can be deleted from storage at the end of a user session.

Figure 6:
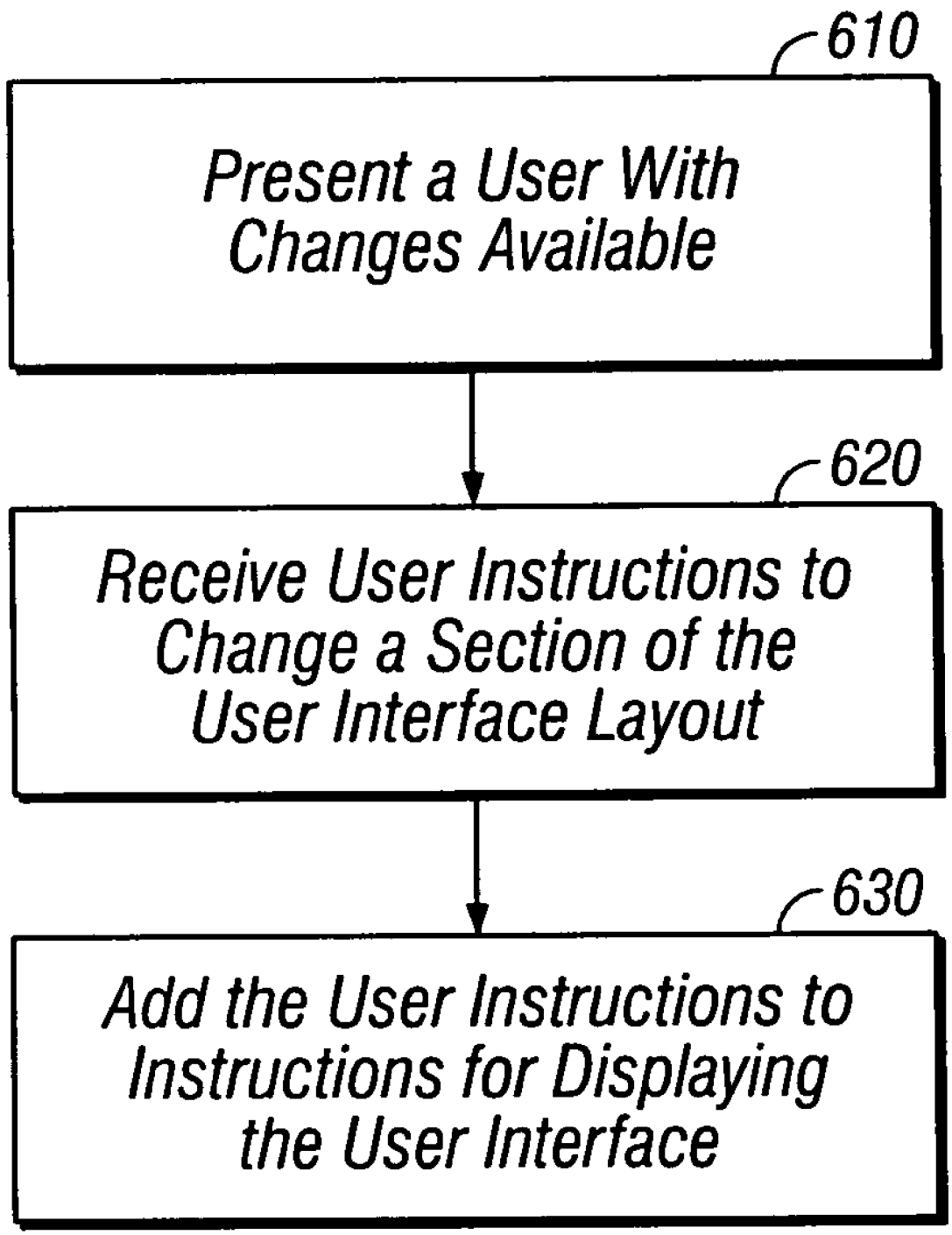
FIG. 6 is a flow diagram illustrating a method for changing a layout in a user interface.
Figure 7A:
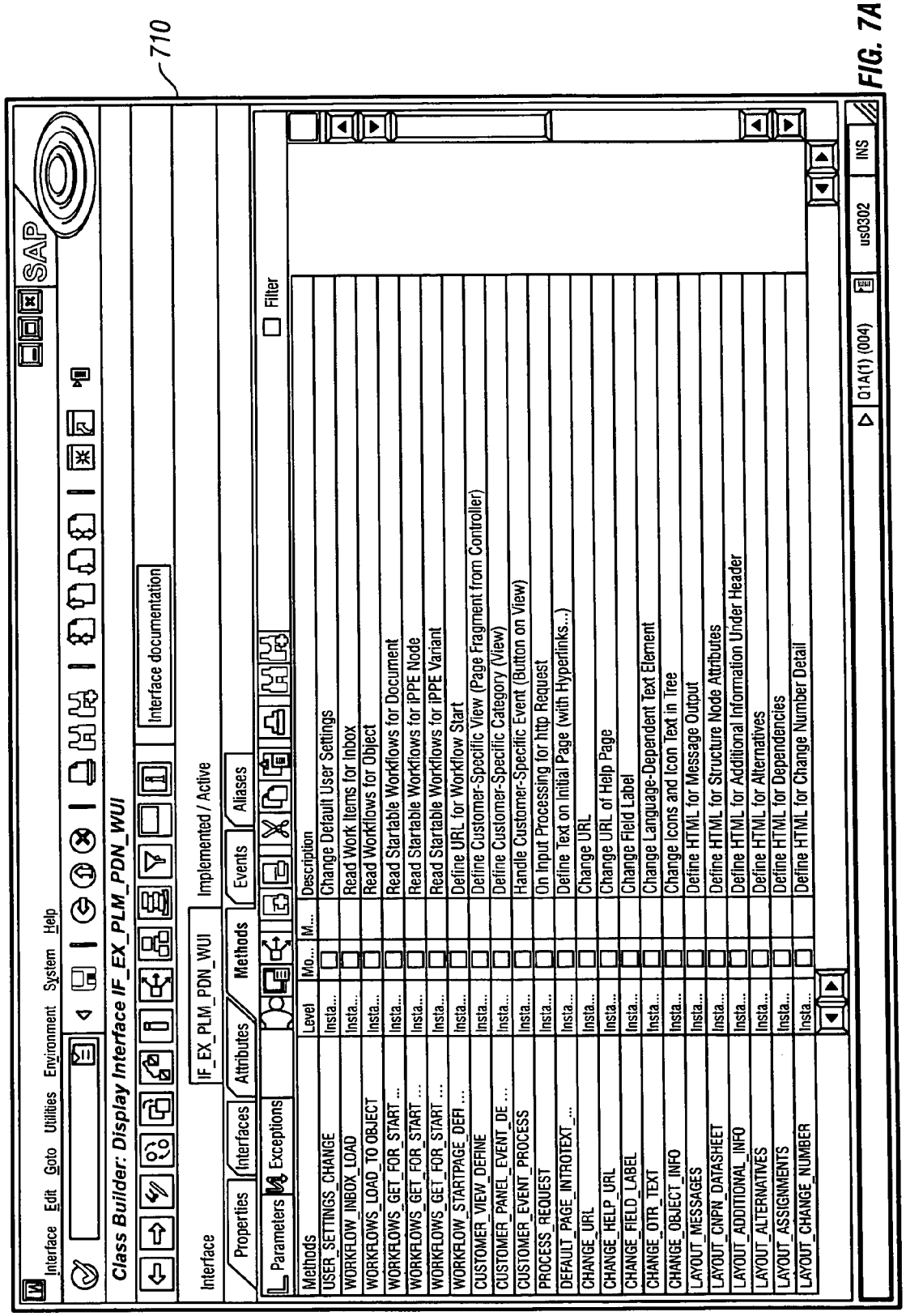
FIGS. 7A-C show screen shots illustrating controls for changing layout in a user interface.

FIG. 6 is a flow diagram illustrating one implementation of a method for changing layout in a user interface. System 100 presents a user with changes available for a UI 300 (step 610). A user can be presented with the available changes through a second UI, such as the UI 710 shown in the screen shot of FIG. 7A. As illustrated in UI 710, a user can change URLs, field labels, text elements object information, and other layout information. The methods that start with "LAYOUT" can be used to add hypertext markup language ("HTML") code or to suppress the standard layout of the UI 300.

Figure 7B:
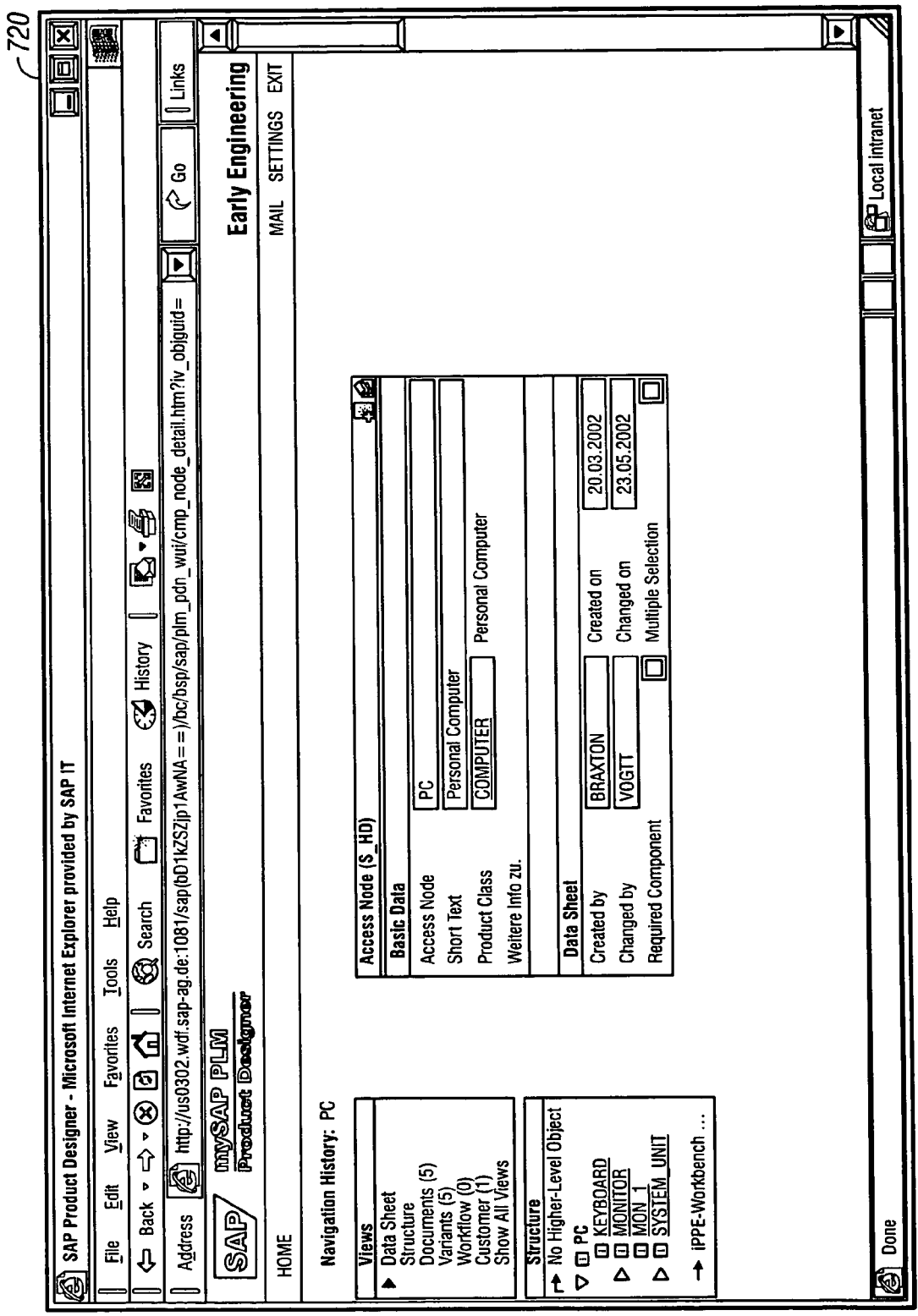

System 100 can receive user instructions to change a section of the UI 300 layout (step 620). Receiving instructions can include user selection of controls for pre-defined changes or receiving code, such as HTML code. As shown in screen shot 720 of FIG. 7B, a customer view labeled "Customer 1" has been added to the view selector. Also, the label of the field next including the entry "Personal Computer" has been changed to "Short text." This can be done through coding such as the example shown in Table 1.

TABLE 1

```
method IF_EX_PLM_PDN_WUI~CHANGE_FIELD_LABEL.
  if iv_dataelement = 'PVS_PNODETX'.
    cv_label = 'Short text'.
  endif.
endmethod.
```

System 100 can add the received instructions to the existing instructions for presenting UI 300 to a user (step 630).

Figure 7C:
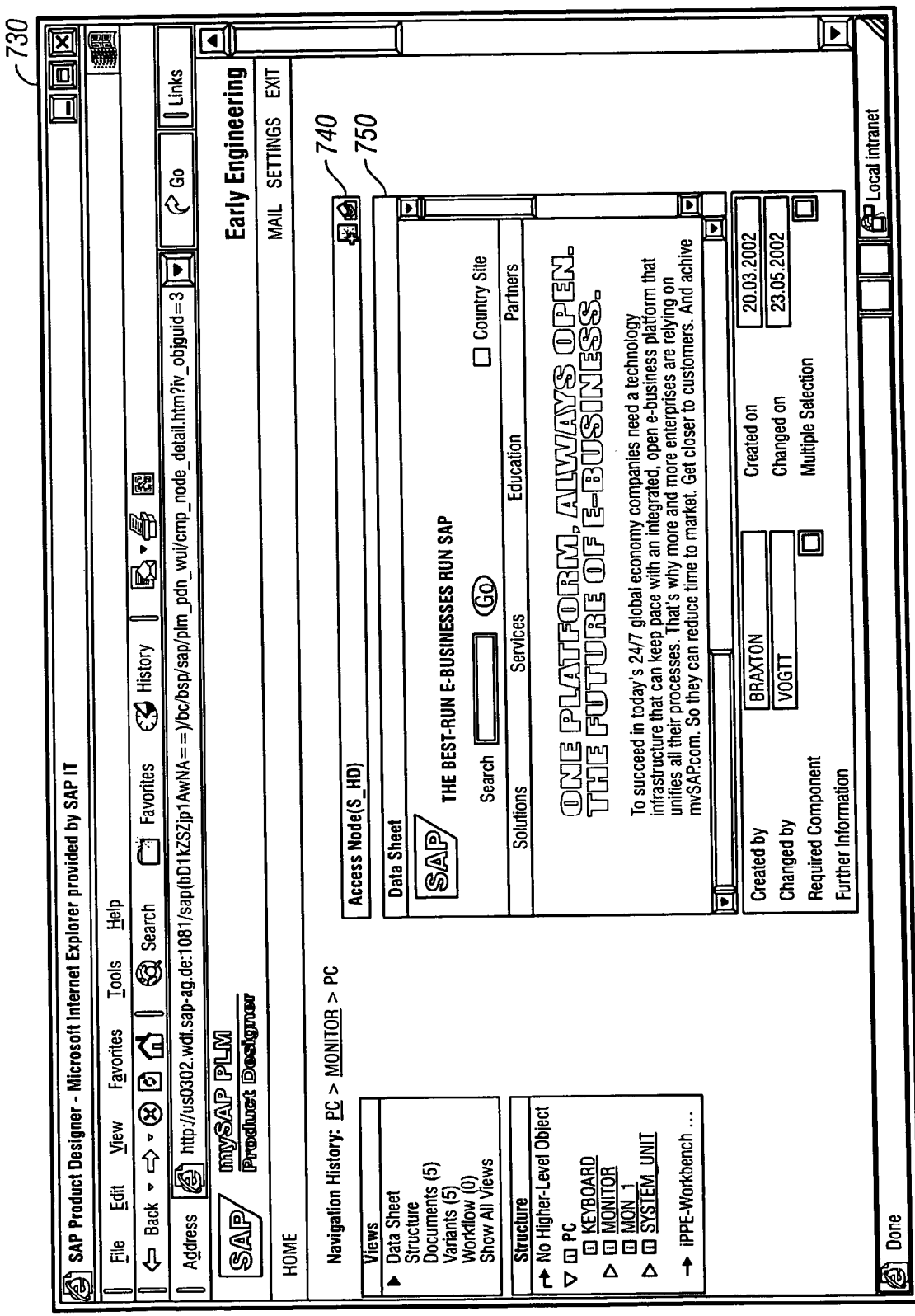

Another example of changed layout is shown in screen shot 730 of FIG. 7C. For this change, coding in a first group 740 box of area 330 has been suppressed using coding such as the example shown in Table 2.

TABLE 2

```
method IF_EX_PLM_PDN_WUI~LAYOUT_OBJECT_HEADER.
  ev_suppress_group = 'X'.
endmethod.
```

In a second group box 750, HTML has been added to insert an iframe, showing another web page, at the beginning of the group. The iframe and a link labeled "Further Information" is added using coding such as the example shown in Table 3.

TABLE 3

```
concatenate '<table><tr><td>'
  '<iframe src="http://www.sap.com" width="500" '
  'height="300" frameborder="0" '
  'align="left" valign="top" scrolling="yes" >'
  '</iframe>'
  '</td></tr></table>'
into ev_html_string_top.
ev_html_string_bottom = '<a href="#1">Further Information...</a>'.
```

The instructions can also include changing icons or text associated with an icon. The instructions can be inserted at any exit point of an application. The instructions can be inserted at the beginning of a page fragment or the end of a page fragment.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. The to systems and methods described can be applied to any user interface that allows modification, either statically or dynamically, at run time. The systems and methods can be applied to, for example, Web-based user interfaces. The Web-based interface can use page fragments and any markup language such as, for example, JavaServer Pages™, Active Server Pages, and Business Server Pages. Alternatively, the user interface described can be implemented by using servlets or any HTTP server, which content can include instructions derived from programming languages such as, for example, C++, COBOL, JAVA, and Advance Business Application Programming ("ABAP"). Any part of the user interface can be changed, including, for example, field labels, text, hyperlinks, and Multipurpose Internet Mail Extensions ("MIME") objects. A user, as used in this specification, refers to any combination of a human operator or a computer-program product. The user can be an administrator, developer, or programmer who may not have been involved with developing the user interface application but who are responsible for customizing the user interface for an enterprise that is a customer of the provider of the user interface application. The methods and apparatus described are not limited to product structures but, rather, can be applied to any structures of business objects, such as, for example, an organization structure or a project hierarchy.

What is claimed is:

1. A method, comprising:
   presenting to a user, through a user interface, views of one or more objects in a product structure associated with a tangible product;
   presenting a user with one or more exit points in existing computer code, the existing computer code defining an appearance of the user interface, and including textual instructions that define an existing layout of the user interface, the exit points comprising locations in the textual instructions into which user instructions for changes to the user interface can be inserted;
   receiving a user selection of an exit point;
   receiving a textual user-defined coding, the textual user-defined coding including lines of code defined by and entered by the user, the lines of code comprising instructions to implement a change to at least a portion of the existing layout of the user interface;
   providing an ability to, in response to the textual user-defined coding, suppress one or more sections of a standard layout of the user interface; and
   adding the textual user-defined coding to the textual instructions of the existing computer code at the exit point selected, wherein adding modifies the existing layout of the user interface in accordance with the instructions for implementing the change.

2. The method of claim 1, further comprising:
   changing one of a field label, text, hyperlink, and MIME object of the user interface in response to adding the textual user-defined coding.

3. The method of claim 1, further comprising:
   suppressing one or more sections of a standard layout of the user interface, in response to adding the textual user-defined coding, when presenting the user interface to the user.

4. The method of claim 1, further comprising:
   inserting one or more sections to the user interface layout in response to adding the textual user-defined coding.

5. The method of claim 1, further comprising:
   changing one or more of an icon and information regarding the icon in a tree display of the user interface in response to adding the textual user-defined coding.

6. The method of claim 1, wherein adding the textual user-defined coding comprises adding the textual user-defined coding at the beginning of a user interface page fragment.

7. The method of claim 1, wherein adding the textual user-defined coding includes adding the textual user-defined coding at the end of a user interface page fragment.

8. The method of claim 1, wherein receiving the textual user-defined coding includes receiving instructions in markup language.

9. The method of claim 8, wherein receiving instructions in markup language includes receiving instructions compatible with one of Java Server Pages, Active Server Pages, and Business Server Pages.

10. The method of claim 1 in which presenting to a user, through a user interface, views of one or more objects in a product structure associated with a product includes presenting to the user a views area for listing available views for the product structure.

11. The method of claim 1 in which presenting to a user, through a user interface, views of one or more objects in a product structure associated with a product includes presenting to the user a workspace area for displaying a current component and a current view on which the user is working.

12. A computing system comprising:
   a data store storing existing computer code including textual instructions for displaying a first user interface, and for presenting, within the first user interface, views of one or more objects in a product structure associated with a tangible product, and instructions for displaying a second user interface for presenting available options for changing a layout of the first user interface; and
   one or more processing devices for displaying the second user interface to a user, the one or more processing devices configured to:
      receive a textual user-defined coding, the textual user-defined coding including lines of code defined by and entered by the user, the lines of code comprising instructions to implement a change to at least a portion of an existing layout of the first user interface;

provide an ability to, in response to the textual user-defined coding, suppress one or more sections of a standard layout of the first user interface;

add the textual user-defined coding to the textual instructions for presenting the first user interface, the user-defined coding being added to the textual instructions of the existing computer code at a user-selected location; and display the first user interface to reflect the change implemented by the textual user-defined coding to the existing layout of the first user interface.

13. A computer-program product, tangibly stored on a machine-readable medium, the product comprising instructions operable to cause one or more processing devices to:

present a user interface showing views of one or more objects in a product structure associated with a tangible product, identify one or more exit points in a set of textual instructions that define an existing layout of the user interface, the set of textual instructions belonging to an existing coding that defines an appearance of the user interface, the exit points comprising locations in the set of textual instructions into which user instructions for changes to the user interface can be inserted;

present a user with one or more of the exit points;

receive a user selection of an exit point;

receive a textual user-defined coding, the textual user-defined coding including lines of code defined by and entered by the user, the lines of code comprising user instructions to change at least a portion of the existing layout of the user interface;

provide an ability to, in response to the textual user-defined coding, suppress one or more sections of a standard layout of the user interface; and add, at the exit point selected, the textual user-defined coding to the set of textual instructions, wherein adding modifies the existing layout of the user interface in accordance with the user instructions.

14. The product of claim 13, further comprising instructions to:

change one of a field label, text, hyperlink, and MIME object of the user interface in response to adding the textual user-defined coding.

15. The product of claim 13, further comprising instructions to:

suppress one or more sections of a standard layout of the user interface, in response to adding the textual user-defined coding, when presenting the user interface to a user.

16. The product of claim 13, further comprising instructions to:

insert one or more sections to the user interface layout in response to adding the textual user-defined coding.

17. The product of claim 13, further comprising instructions to:

change one or more of an icon and information regarding the icon in a tree display of the user interface in response to adding the textual user-defined coding.

18. The product of claim 13, further comprising instructions to:

acid the textual user-defined coding at the beginning of a user interface page fragment.

19. The product of claim 13, further comprising instructions to:

add the textual user-defined coding at the end of a user interface page fragment.

20. The product of claim 13, further comprising instructions to:

receive instructions in a markup language.

21. The product of claim 13, further comprising instructions to:

receive instructions compatible with one of JavaServer Pages, Active Server Pages, and Business Server Pages.

* * * * *